Jan. 17, 1956 F. A. SÜBERKRUB 2,730,877
FLUID COUPLING
Filed Jan. 14, 1952 2 Sheets-Sheet 1
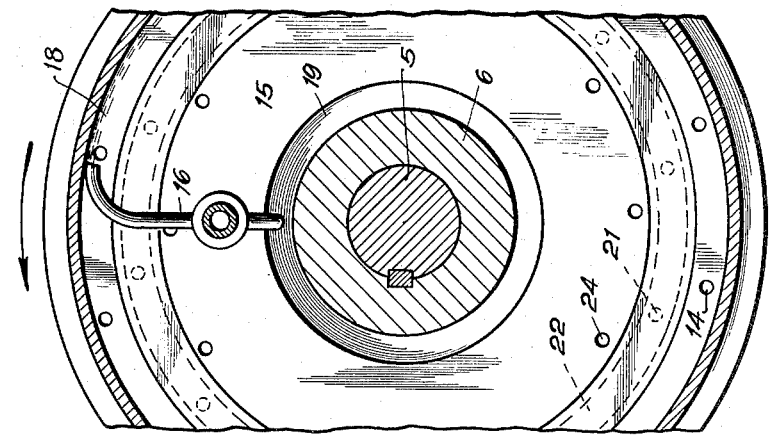
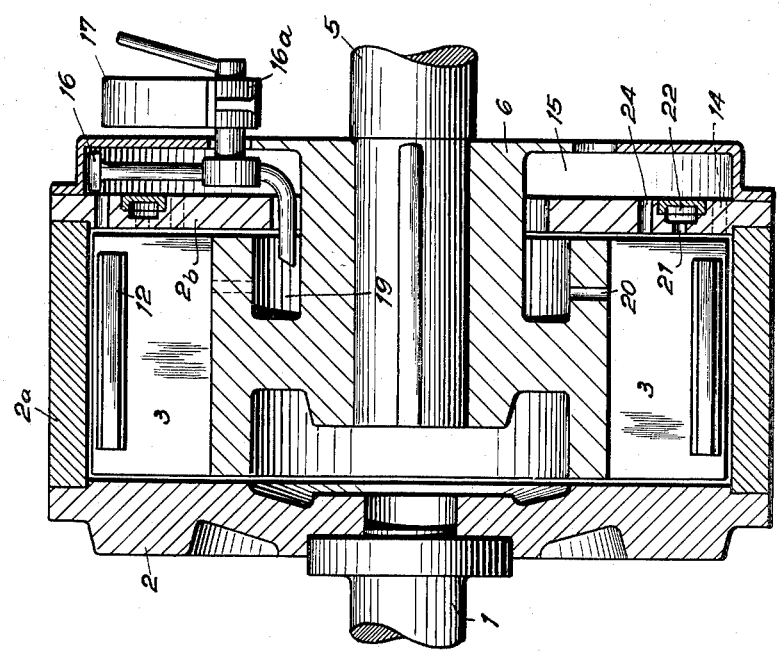
INVENTOR
FRANZ AUGUST SÜBERKRUB
BY *Robert E. Burns*
ATTORNEY

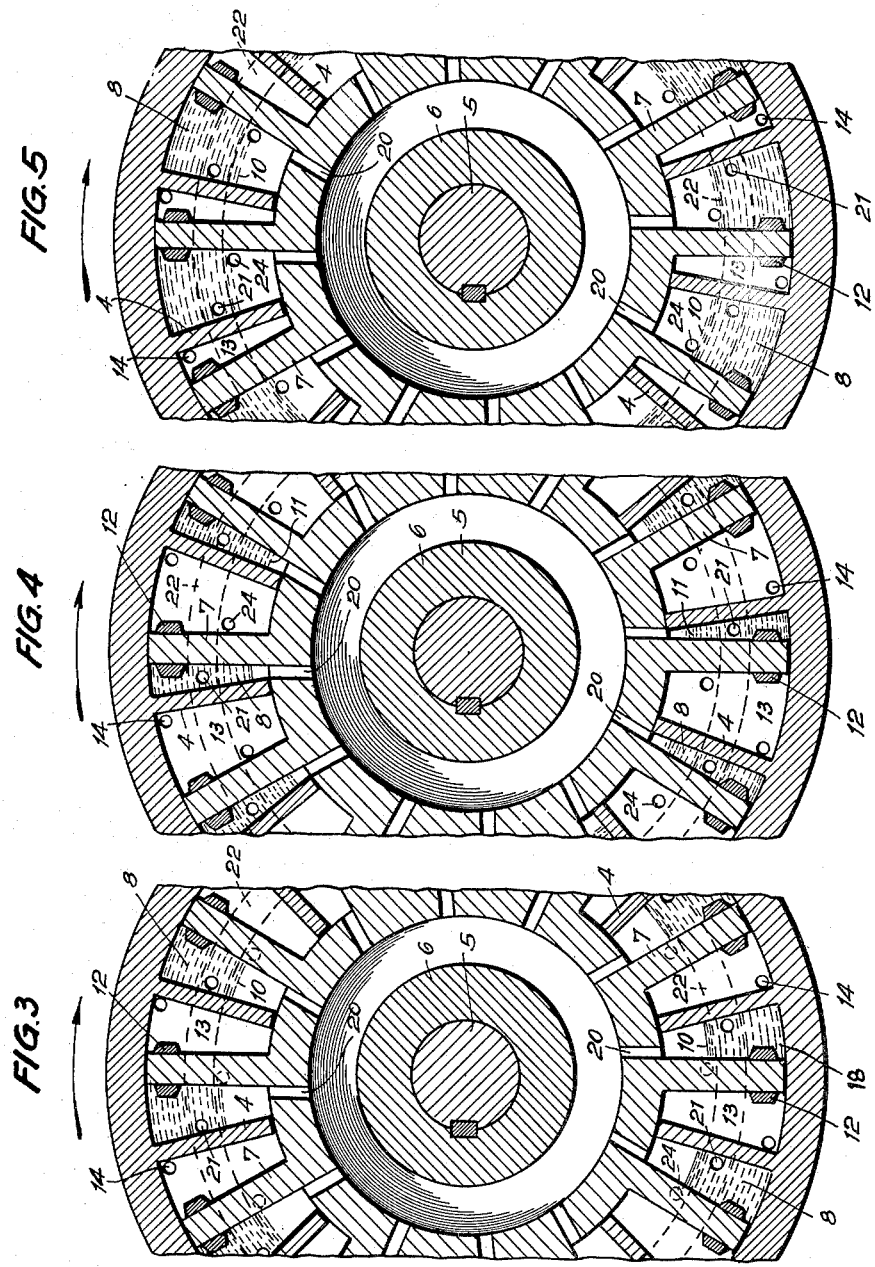

United States Patent Office 2,730,877
Patented Jan. 17, 1956

2,730,877

FLUID COUPLING

Franz August Süberkrub, Hamburg, Germany

Application January 14, 1952, Serial No. 266,369

Claims priority, application Switzerland January 18, 1951

5 Claims. (Cl. 64—26)

This invention relates to a method of fluid transmission and to a transmission mechanism therefor.

Liquid couplings for elastically transmitting the torque from a driving shaft to a driven shaft are known. Fottinger couplings, for example, use centrifugal force to set the liquid in the rotating couplings into streaming motion to circulate as hydro-dynamic energy between the coupling members of the adjoining shafts. There is a difference of about 3% between the revolutions of the driving and the revolutions of the driven shaft which is referred to as "slip." This "slip" represents the amount of power continuously used and lost in effecting the coupling action. In addition to this loss of power the couplings are necessarily large, heavy and expensive because their dimensions depend on the third power of the revolutions. This is a serious disadvantage particularly in the driving machinery of a ship since the revolutions of such machinery are usually kept as low as possible.

Another type of hydro-elastic torque transmission system uses a pump, e. g. a toothed wheel pump, to produce hydro-static pressure between the coupling members of the adjoining shafts. At excessive torques, owing to torsional vibrations, part of the liquid escapes through pressure relief valves. The thus produced slip between the adjoining shafts consumes the excess torque at torsional oscillations. The fault of these couplings is a constant loss of power, complicated component members and rapid wear of certain parts.

The object of the present invention is to provide a rotating coupling between a driving and a driven member for elastic transmission of torque using as means for such transmission the hydrostatic pressure of an enclosed liquid produced by centrifugal action.

The torque acts on the liquid which is enclosed in chambers formed inside of an annular casing of one of the members of the coupling by a plurality of circumferentially spaced-apart and radially-arranged fixed walls while into the open spaces therebetween a corresponding set of circumferentially movable walls is arranged and these movable walls are connected to the other member of the coupling. The edges at the side and at the outer end of said movable walls are in sliding contact with the side walls and the rim of the surrounding annular casing. Normally every second chamber is filled with a limited quantity of liquid which, upon rotation of the coupling, forms an inner free surface. Said free surface changes its distance from the center of rotation when the opposing walls of the chambers containing the liquid, under the influence of the fluctuating torque, draw closer to each other or vice versa. The liquid exerts hydrostatic pressure. Thus, when the surface area of each opposing radial wall which is in contact with the liquid increases or decreases by reason of the changing distance of its free surface from the center rotation, the total force which keeps the walls apart from each other also increases or decreases and the fluctuations of the normal torque which is to be transmitted are thereby counteracted in a resilient manner.

Other objects and features of this invention will be apparent from the description which follows and from the accompanying drawings.

An illustrative embodiment of the fluid coupling of the present invention is shown in Figures 1 to 5 of the accompanying drawing, wherein:

Figure 1 is a vertical longitudinal sectional view through a coupling embodying features of the invention taken along the axis of the shafts.

Figure 2 is a vertical transverse cross-section through the coupling of Fig. 1 showing in detail a stationary filling pipe supported from the outside within the rotating part of the coupling and used for filling the coupling with liquid and refilling it to make up for leakages between the driving and the driven part of the coupling.

Figures 3, 4 and 5 are partial cross-sectional views through the coupling showing the circumferentially arranged chambers and illustrating, respectively, three different mutual positions between the driving and the driven part of the coupling.

The coupling illustrated is disposed inside the flywheel of a Diesel engine arranged to transmit its power to a drive shaft of a reduction gear. The numerals in the various figures designate corresponding parts.

On the motor shaft 1 is fitted a flywheel 2, 2a, 2b, consisting of several component parts, and defining an internal cylindrical hollow space 3. Space 3 is subdivided by a plurality of radial walls 4 (Figures 3, 4 and 5). Walls 4 are arranged between the inside of the rim and the sides of the flywheel 2 and are absolutely liquid tight. On the driven shaft 5 there is a hub 6 and thereon are disposed radial walls 7 corresponding in size and number to the radial walls 4 inside of the flywheel (Figures 3, 4 and 5). Walls 7 are fitted snugly between the side walls and the circumferential rim of the hollow space 3 but are free to move therein circumferentially between the walls 4. Tightness of these walls may be effected by strips of packing.

Each second chamber 8 between the radial walls 4 and 7 contains an equal amount of liquid, e. g. oil, which upon rotation of the flywheel 2 is hurled against the surrounding rim and presses against the walls 4 and 7. The amount of pressure not only depends on the number of revolutions and the quantity of oil contained in the said spaces 8 but also upon the radial depth of the oil. If, for example, the oil does not reach to surface 10 (Figure 3) but to surface 11 of chamber 8 (Figure 4, with walls 4 and 7 closer to each other), then the pressure on the walls 4 and 7 will be greater though the amount of the liquid has not changed. At increased torque, due to torsional oscillations, walls 4 and 7 are pressed more closely toward each other and then the radial depth of the liquid will rise automatically.

This dependence of the amount of pressure against the walls 4 and 7 upon the radial depth of the liquid acts as an elastic cushion for taking up variations of torque just like an elastic spring. If by oscillation of torque on the flywheel 2, for example, walls 4 arranged therein press the liquid in chambers 8 to the radial depth 11 (Fig. 4), then the total pressure between the two parts of the coupling wlill rise. On the other hand, if the pressure or the torque drops again, walls 4 and 7 will increase in distance after having reached a maximum during the maximum increase of speed due to oscillation.

It should be noted that it is not only the radial depth of the liquid but also the hydro-static pressure which changes between the two walls upon any change of the rotational speed of the coupling. Thus the depth of the liquid and its inherent hydro-static pressure act jointly as an elastic member which takes up large torques and variations of torque in a coupling with comparatively small general dimensions. The total amount of torque which a given coupling can manage depends upon the number of revolutions, the greatest diameter of the hollow cylinder 3, the area and the number of radial walls under pressure, and the radial depth of the oil between the walls of the driving and the driven part of the coupling.

When the driving engines first start up, stop or rotate astern, for a short while there will be no centrifugal forces available. To take care of such conditions, springs or buffers 12 of other elastic material are arranged between each two adjoining walls 4 and 7. After a few revolutions, however, there will be sufficient liquid and pressure between the said walls to separate them again.

Oil leaking from the oil filled chambers 8 around the edges of the radial walls 7 into the adjoining empty spaces 13 will immediately flow out through holes 14 into the open annular space 15 (Figures 1 and 2) disposed on the outside of the flywheel and rotating with it. One or more stationary oil catching pipes 16 (Figures 1 and 2) held from the outside within this annular space 15, their outer extreme ends being open against the turning direction of the coupling for catching the oil 18 which may be hurled around therein. Their inner ends open toward the annular space 19. Between said pipes and an outside stationary oil container 17 there is a three-way cock 16a which allows the passage of oil either from the container 17 into the annular space 19 or from the periphery of space 15 to the said annular space 19 or from the space 15 back into the container 17. Driven by centrifugal forces in space 19 through the drill-holes 20 (Figures 1, 3, 4 and 5), the oil passes into the chambers 8 between the walls 4 and 7. Its uniform distribution in these chambers is assured by the circumferential canal 22 (Figures 1, 3, 4 and 5) and the holes 21 between the chambers 8 and the said canal 22.

For the purpose of regulating the correct quantity of oil in the chamber 8 so as to allow the coupling to comply with normal torque and revolutions of the driving shaft, the cylindrical spaces 3 and the oil collector space 15 are connected by another set of holes 24 through the wall 2b of the flywheel (Figures 1, 3, 4 and 5). The radial distance of these holes 24 from the circumference of the cylindrical space 3 controls the correct radial depth of the oil in chambers 8. At normal speed and torque and with the correct quantity of oil, the access to holes 24 will be covered by the sides of walls 7 and no oil will pass through them (Figure 3). For the first oil filling into chambers 8 and for testing the correct quantity of oil within the coupling, the oil container 17 and annular space 19 must be connected directly by means of the three-way cock 16a whereby an excess quantity of oil passes into the chambers 8. This in turn causes the distance between the walls 4 and 7 to increase, opens the access to holes 24 and allows free passage of the excess oil from chambers 8 to the collector space 15 (Figures 1 and 5). By now turning the handle of the three-way cock (16a) so as to connect the outer end of the oil catching pipes 16 with the container 17, the excess oil in space 15 will be pressed back into the container 17. The coupling is then correctly filled.

Annular space 15 and pipes 16 can also be dispensed with when the coupling is enclosed in a stationary casing shaped to catch up the oil which passes out through the holes 14 or 24. This oil is collected then in a tank below the coupling and pumped back at intervals, i. e. whenever required, by any pump means into the annular space 19.

It is also possible to provide in the hydro-elastic coupling, according to the present invention, a clutch-gear which permits the two adjoining shafts to be connected or disconnected at will. This will be of advantage between a driving motor and a reduction gear. For this purpose, the radial walls 7 should not be fitted directly to a hub on one of the shafts but to an independent ring, the clutch-gear being arranged between the shaft and this ring.

It will be obvious that various other changes and modifications may be made in the embodiment illustrated without departing from the scope of the invention as defined in the appended claims and it is intended therefore that all matter contained in the foregoing description and in the drawing shall be interpreted as illustrative only.

What I claim and desire to secure by Letters Patent is:

1. A rotating coupling for elastic transmission of power from a driving member to a driven member using hydrostatic pressure produced by centrifugal action in a liquid contained in said coupling, said coupling comprising a hollow circular casing having a circumferential rim and side walls and a plurality of circumferentially spaced-apart radial walls fixedly arranged within said casing between its rim and its side walls, said casing being connected for rotation with one of said members, a plurality of second radial walls positioned on the other member, said second radial walls being disposed with their sides and their outer edges snugly but circumferentially movable within the open spaces between the first-named radial walls, the fixed radial walls and the movable radial walls defining in combination with the side walls and the rim of the casing confined chambers therebetween, inlet means cooperating with said chambers for supplying liquid to selected ones of said chambers and outlet means extending through the walls of said chambers and spaced radially outwardly of the radial inner ends of said chambers, said outlet means being selectively placed into and out of communication with the selected chambers containing the fluid by the relative circumferential movement of the movable radial walls between the fixed radial walls, the circumferential position of the movable walls with respect to the fixed radial walls and with respect to said outlet means for the liquid defining and limiting the liquid in the selected chambers to a quantity not exceeding the minimum volume of said selected chambers when the radial walls of said selected chambers draw closer to each other as a result of pulsations during normal torque transmission.

2. A rotating coupling as defined in claim 1, further comprising means defining a radially inner annular space rotating with the coupling and said inlet means comprising openings providing communication between said inner annular space and the inner part of said selected chambers to permit the liquid to be supplied from said inner annular space to the selected chambers by centrifugal action.

3. A rotating coupling as defined in claim 2, comprising on one of the outer side walls of the casing means defining an annular space for collecting any liquid escaping through the said outlet means of the chambers and a substantially radially disposed pipe held stationarily from the outside of the coupling inside of said annular space, its inner end communicating with said radially inner annular space and the inlet means to the chambers while its outer end is bent to form a scoop near the circumference of said annular space opening up against the direction of rotation of the coupling.

4. A rotating coupling as defined in claim 1, further comprising means defining a channel providing communication among said selected chambers for flow of liquid therebetween.

5. A rotating coupling as defined in claim 1, wherein the chambers adjoining said selected chambers are provided with outlet means extending through the walls of the casing near its circumference and communicating with the exterior of the walls for draining away liquid escaping from said selected chambers around said second radial walls.

References Cited in the file of this patent
UNITED STATES PATENTS
1,685,839    Du Bois _____ Oct. 2, 1928